United States Patent

Hough

[15] 3,696,931
[45] Oct. 10, 1972

[54] VESSEL HAVING AN OSMOTIC MEMBRANE AS AN ENCLOSING PART THEREOF

[72] Inventor: William T. Hough, 312 South Finley Avenue, Basking Ridge, N.J. 07920

[22] Filed: April 16, 1969

[21] Appl. No.: 816,765

Related U.S. Application Data

[63] Continuation-in-part of Ser. No. 442,122, March 23, 1965, abandoned, and a continuation-in-part of Ser. No. 813,376, Feb. 26, 1969, Pat. No. 3,532,621.

[52] U.S. Cl. ................210/244, 210/321, 210/455, 210/479, 210/482
[51] Int. Cl. ......................B01d 31/00, B01d 13/00
[58] Field of Search..........210/22, 23, 321, 455, 479, 210/482, 244

[56] References Cited

UNITED STATES PATENTS

| 1,483,498 | 2/1924 | Zolnerevich.............210/244 |
| 3,156,645 | 11/1964 | Chapin et al. ............210/120 |

*Primary Examiner*—Frank A. Spear, Jr.

[57] ABSTRACT

A cup having an osmotic membrane as a cover for an opening in the bottom or side of the cup for a process for desalinization of sea water by regular (natural) osmosis of water from sea water into a comestible food which is neither separable by volatilizing nor separable from liquid phase water by other methods, and the diluted comestible food may be consumed without further processing.

15 Claims, 4 Drawing Figures

PATENTED OCT 10 1972 3,696,931

*INVENTOR.*
WILLIAM T. HOUGH
BY William T. Hough
ATTORNEY

VESSEL HAVING AN OSMOTIC MEMBRANE AS AN ENCLOSING PART THEREOF

This is a continuation-in-part of application U.S. Ser. No. 442,122 filed Mar. 23, 1965, now abandoned, and continuation-in-part application Ser. No. 813,376 filed Feb. 26, 1969, U.S. Pat. No. 3,532,621.

This invention relates to a process by which solvent having solutes dissolved therein which are not easily nor economically removable therefrom, may be either extracted directly to a comestible (eatable or potably drinkable) food, for example, or extracted into a nonvolatile solute separable from liquid phase water but characterized by the chemical and physical properties of being resuspendable into solution after precipitation whereby the precipitable solute is reusable in an economically attractive cyclic process for producing potable water.

BACKGROUND

Within recent years, increases in population and the continued expansions of old industries and the development of new industries have cumulatively contributed to the growing need for new and inexpensive sources of both palabable (potable) water for drinking purposes and industrial water sufficiently free of salt and minerals in general normally found in sea water and other sources of saline water, to permit industrial use of the water.

Many diverse methods have been employed to obtain water which is free of objectionable salts.

The probably oldest typical example is a process employing distillation. However, because of the expense of about 1.10 per 1,000 gallons as a result of the heat required for distillation, this method has been impractical for the production on a commercial scale of large quantities of water over an indefinite but extended period of time. In the absence of more satisfactory and less expensive methods, it has been necessary in many cases to continue use of the unsatisfactory distillation method.

Other typical methods concurrently being employed, but at great expenses, are the ion-exchange and electrodialysis methods whereby the salt is withdrawn from the saline solution. Electrodialysis is a unit process that uses an induced electric current to separate the cationic and anionic components of a salt solution; it relies on use of membranes that permit ions to pass from dilute to concentrated solution. At about 35 percent of full operation of an electrodialysis desalination plant, the cost is about $0.63 per 1,000 gallons of water product produced, and at about 98 percent of full operation costs about $0.33 per 1,000 gallons of water; these typical costs are involved in reducing salt concentration from about 2,075 parts per million (ppm) to about 500 ppm. In another typical electrodialysis operation, at 65 percent full operation, the cost is $1.95/1,000 gallons or at 90 percent, $1.35/1,000 gallons, in reducing salt content from about 1,700 ppm to about 300 ppm.

Another method that has been employed with very little success in so far as practical commercial feasibility because of the continued high costs involved, is the ultra-filtration method commonly known as reverse osmosis, in which pressures up to about 600 pounds per square inch (psi) are exerted on a saline solution having an osmotic (filtering — not technically related to osmosis) membrane adjacent thereto and in intimate contact therewith whereby water is forced from the saline solution through the osmotic membrane into a collecting vessel on the opposite side of the partitioning osmotic membrane from which the water is withdrawn in a salt-free state, theoretically; as a matter of fact, typically salt also is forced through the membrane to the extent of about 500 ppm in the desalinization of a mere concentration of about 2,500 ppm of salt; in contrast, see water averages about 35,000 ppm (35M ppm) of salt. Because of the excessively large pressure required for reverse osmosis, the pressure rapidly destroys the initial efficiency of the membranes, even though many devices have been tried and/or employed to reinforce the membranes. A typical reverse osmosis process ranges from about 13 to 22 gallons per square foot per 24 hours, typically at allegedly 7 to 16 cents less expense than electrodialysis, but at one installation at about $0.35 to $0.90/M gal. in lowering from 2,500 to 500 to 600 psi and at another installation at about $0.50 to $0.70/M gal. in lowering from about 2,500 ppm to 500 ppm at 600 psi.

Another method being employed is multi-stage flash desalination at one installation at about $0.65/1,000 gal. in lowering from 35M ppm to about 5 ppm, and at another installation at about $0.85/1,000 gal. in lowering from about 35M ppm to about 10 ppm; this cost is economically unattractive.

Another typical method currently employed is a vaporization method in which splashing water (containing objectionable material such as salt) produces increased vapor pressure which is subsequently condensed in the form of a relatively salt-free water by means of contacting the vapor with a smooth surface whereby the condensed moisture is collected separately from the agitated saline water. Such a process requires sufficient energy to agitate the saline water as well as the heat of vaporization and unfortunately obtains only a very low yield of condensed moisture relative to the time and energy expended.

Within recent years, with the development of refined methods of employing atomic energy and in the absence of more satisfactory and economical methods of obtaining salt-free water, nuclear energy has been employed in combination with the distillation method discussed above. However, due to the continued high cost of nuclear energy and the expensive plants and safety controls necessary for its employment, and because nuclear energy plants cannot be randomly employed in every area of need independent of the economics of the situation, atomic energy has not provided the answer to the continuing need for a practical and economical source of salt-free water.

OBJECTS

It is an object of this invention to provide a process for obtaining a solvent which is free of objectionable solute in solution therein.

Another object is to obtain a process which does not require a large input of energy, but yields a high efficiency.

Another object is to obtain water which is substantially free of objectionable salts and/or other objectionable materials or minerals in solution therein.

Another object is to obtain a process for producing water which is free of objectionable salt, on a large scale production of the salt-free water.

Another object is to obtain a process for producing water which is free of objectionable salt dissolved therein, at a sufficiently low cost that the process is economically feasible for large scale production of salt-free water.

Another object is to obtain a process for producing water which is free of objectionable salt dissolved therein, which process does not require a large and/or expensive plant facility.

Another object is to obtain a process for producing water which is free of objectionable salt dissolved therein, which may be employed in diverse locations in the world irrespective of the lack of conventional resources.

Another object is a process employing a solute into which water may be drawn by an osmotic process from a solution of undesirable solute such as sea salts, in which the employed solute is easily and economically precipitated into a water-insoluble state and is easily and economically reconverted into a water-soluble state for reuse.

Another object is a process which by the employment of a select class of solutes may extract potable water directly from an unusable (non-potable) water source such as sea water and be thereafter consumed without further processing.

Another object is an article for easily and economically practicing the above process without the requirement of extensive equipment and/or resources, and in a form easily transportable by an individual person, for example, when traveling to or camping in remote areas.

Other objects become apparent from the above and following disclosure.

SUMMARY OF THE INVENTION

The objects of this invention are accomplished by one process employing a comestible, preferably food, solute into which water is caused to flow by osmosis from sea water through a semi permeable membrane, which comestible solute is substantially non-volatile and substantially non-separable from water because of its water solubility, when the water is in the liquid phase, and by another process employing a substantially non-volatile solute which by processes other than the precipitation method of this invention is substantially nonseparable and non-reusable (by reconverting it into a water soluble form after precipitation from the water) in liquid water. In particular, the comestible solute may be any eatable or potable solute. The solute which is precipitatable and which may be subsequently reconverted to the water-soluble state is selected from the group consisting of (a) an aqueous sulfurous acid solution of a sulfite of an alkaline earth metal, and (b) a water-soluble sulfur dioxide comples of a metal oxide, which when treated with sufficient alkaline earth metal (a) to neutralize the sulfurous acid, or (b) to react with the complex to form a sulfite, or (c) both, precipitates and may be thereafter separated by any desirable, or convenient method such as conventional filtering and/or centrifuging methods, for example. The invention also includes a method of separating the metal oxide from the sulfite if desired, prior to reusing the metal oxide; the process of isolating the metal oxide comprises treating a mixture or composition of the metal oxide and the (for example) calcium sulfite with an acid of the strong acid-inorganic acid type, to thereby leach the metal oxide into solution without dissolving the calcium sulfite, separating the filtrate (containing the metal oxide in solution) from the residue of the calcium sulfite, and thereafter precipitating the metal oxide by treatment with an alkali metal whereby the sulfite-alkali metal salt remains in solution while the metal oxide is precipitated, ready for reaction with sulfur dioxide or with sulfurous acid to form the metal-oxide-sulfur-dioxide complex for reuse.

The objects are further accomplished by an article comprising a portable drinking vessel having a semipermeable membrane as a part of the vessel's base, preferably in combination with a comestible solute enclosed therein, for for practicing the process described above for employing a comestible solute. However, the article also may be utilized for the practice of the other process requiring the precipitation of the solute; in such an embodiment, the removable top (cover) to the vessel would include a filter, whereby with the top on the vessel, the potable water containing the precipitate could nevertheless be drunk from the vessel through the filtering top.

THE FIGURES

FIG. 1 illustrates a cup of a conventional type with wall $b$, except for the bottom thereof $a$ which is a semipermeable membrane, and $c$ is a top cover, which optionally may be of a material which is porous to water but suitable for filtering a precipitate.

FIG. 2A illustrates a cross section of another typical embodiment, illustrating the sealed position of the removable top $c'$ and a double walled arrangement of walls $b'$ and $d$ which thereby secure into a sealed position the semipermeable membrane $a'$; the FIG. 2B illustrates an embodiment in which one cover seals the top but is removable, and another cover seals the bottom to keep sanitary the bottom and to prevent the bottom from being exposed to moisture or a liquid before desired; the top cover is designated $c'$, the cup wall is designated $b'$ (same as in FIG. 2A) and the bottom cover is designated $e$.

FIG. 3 illustrates another embodiment of the cup, in which the wall of the cup at the base thereof includes windows such as window $g$ filled with semipermeable membrane such as the membrane at $h$.

The illustrated cups are suitable for setting within shallow water to permit osmosis to take place through the semipermeable membrane into the solute contained therein, such as a food material.

DETAILED DESCRIPTION OF THE INVENTION

Figure 1:
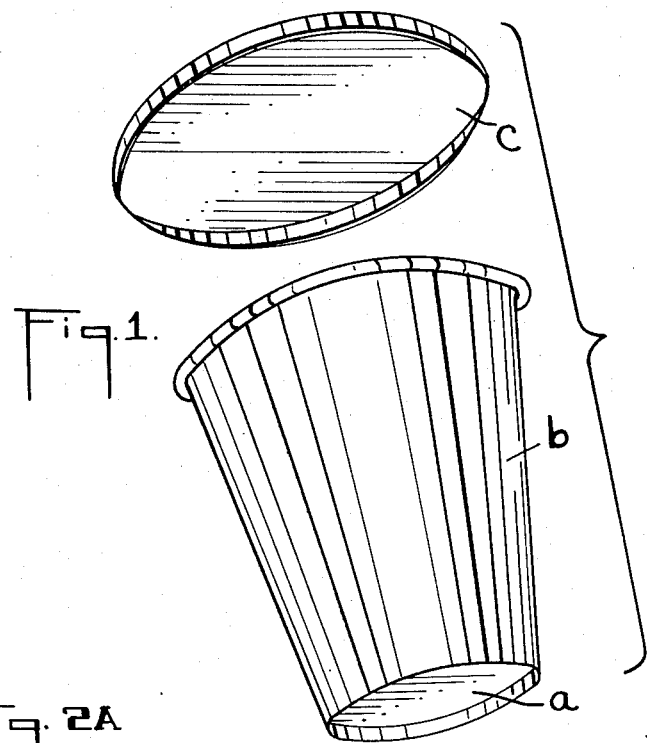
Figures 2A, 2B:
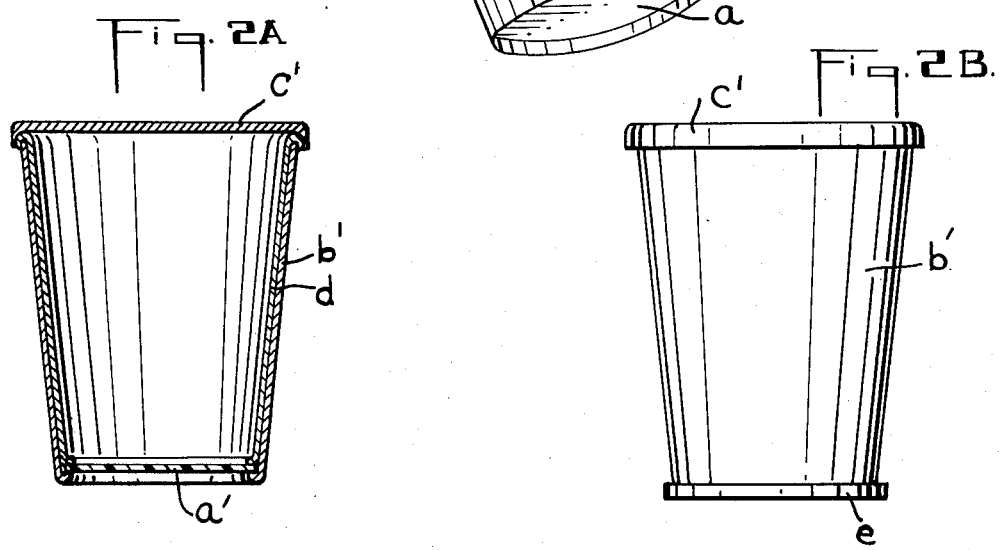
Figure 3:
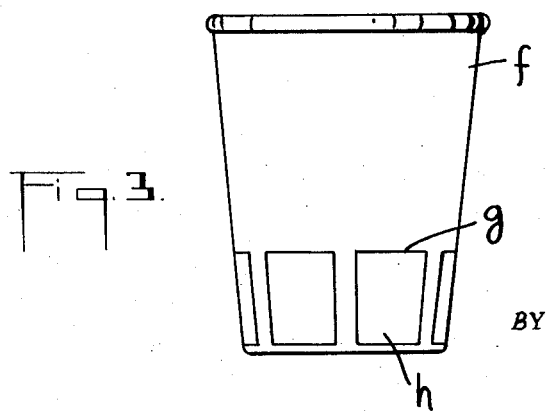

The article of this invention is suitable for the practice of either process described above.

A preferred vessel is a cup which has the semipermeable membrane in the base thereof, but which preferably additionally has a removable and sealable top made of a material or composition of typically a conventional type suitable for filtering from water a precipitate in the water, whereby a precipitated solute by the precipitating process of this invention or by any process of the parent applications of which this application is a continuation-in-part may be separated from the potable water at the time that the cup (or other vessel) is poured into another vessel or glass (for example) or is turned up to the person's lips for drinking.

The vessel may be of any conventional material such as any suitable metal or plastic or fibrous material. In a preferred embodiment, the vessel is a cup such as (for example) illustrated in any one or more of the figures, preferably made of paper and/or waxed paper of the convention type (for example) normally employed in the making of various types of cups. The cup may be of the type capable of enduring hot drink, or alternatively may be of the regular cool or cold water type. A preferred embodiment includes a solute enclosed within the vessel or cup, and the vessel preferably already has a minor amount of water or other comestible solvent within the solute.

It is within the scope of the invention to also include within the cup a suitable conventional purifying agent which will purify the water entering through the semipermeable membrane from the outside water source such as sea water.

However, it should be noted that an advantage to filling the cup (or other vessel) by water of osmosis arises from the fact that a semipermeable membrane is known to exclude certain bacteria and viruses contained in the outside water.

Also, it is within the scope of this invention and highly desirable to boil the salt water in a container prior to placing the cup in the vessel in which the water was boiled; thereby pure and salt-free water is available by use of the article of this invention.

In a preferred embodiment of this invention, the comestible solute is a human food material of any type, provided it is soluble in water. Typical and preferred comestible foods include, for example, foods such as powdered milk, carnation milk, chocolate of any type, but particularly chocolate syrup or cocoa; also, for example, instant foods and/or drinks such as instant coffee are suitable. Various concentrated fruit juices and/or sweet syrups, and/or sugars are other examples.

By the employment of the process of this invention relating to use of comestible solute, particularly of the nutrient type, it would be possible to carry on camping trips or other trips to romote areas merely sufficient food materials, and thereafter utilize the process of this invention, and preferably the simple article, easily transportable, of this invention as a means of securing potable water in the absence of water supply other that natural (nature) sources.

The process relating to the use of a comestible composition as a solute may be defined as a process comprising passing by osmosis water from an aqueous solution of a first solute comprising a water soluble composition, through a semipermeable membrane into a comestible and substantially non-volatile second solute substantially inseparable from liquid phase water, said passing comprising placing said solution of said first solute into intimate contact with a face of said membrane and placing, into intimate contact with an opposite face of said membrane, said comestible solute in an amount sufficiently greater than solute concentration of said first solute that said osmosis takes place. Preferably the aqueous solution comprises substantially sea water containing sea salts. Preferably the comestible solute is a food, preferably powdered milk and/or chocolate.

The process which may be employed in the article preferably having the top of the cup (or other vessel) made of a filter material for filtering the precipitated solute, may be defined as a process comprising passing by osmosis water from an aqueous solution comprising a first solute dissolved therein, through a semipermeable membrane into a second solute selected from the group consisting of (a) an aqueous sulfurous acid solution of a sulfite of an alkaline earth metal oxide, said passing comprising placing said aqueous solution of said first solute into intimate contact with a face of said membrane and placing, into intimate contact with an opposite face of said membrane, said second solute in an amount sufficiently greater than said first solute's concentration that said osmosis takes place, and thereafter adding an alkaline earth metal composition selected from the group consisting of a carbonate and a hydroxide in an amount sufficient to percipitate said second solute as a water-insoluble precipitate. The aqueous solution preferably is sea water and the first solute contained therein preferably comprises sea salts. The metal oxide of the complex is preferably selected from the group consisting of magnesium oxide, iron oxide, and aluminum oxide, or combinations thereof, and the process preferably includes the step of separating the water from the precipitate. The alkaline earth metal composition is of an alkaline earth metal preferably selected from the group consisting of calcium, barium, and magnesium.

The process of isolating the precipitated metal oxide from the sulfite of the alkaline earth metal may be defined as a process comprising (1) acid leaching a composition comprising (1) a sulfite of an alkaline earth metal and (b) an oxide of a metal selected from the group consisting of iron, aluminum, and magnesium, said leaching comprising treating said composition with a strong inorganic acid which produces a water-soluble salt of said metal, (2) separating the filtrate from the residue after the leaching, (3) adding to the filtrate an alkaline earth metal composition selected from the group consisting of a carbonate and a hydroxide, sufficiently to precipitate said metal as an oxide, and (4) thereafter treating said precipitate with a member selected from the group consisting of sulfur dioxide and sulfurous acid, sufficiently to produce a water-soluble sulfur dioxide complex of said metal oxide, the complex being thereby suitable for reuse as the second solute in the process described above. Preferably the strong acid is selected from the group consisting of hydrochloric and nitric acid.

In another embodiment of this invention, although less desirable from the standpoint of corrosive action on the semipermeable membrane, a preferred embodiment not requiring large amounts of reactants is an embodiment in which the second solution of a second solute (into which water flows by osmosis) may be any aqueous acid solution of an organic or inorganic salt which may be precipitated from an acid solution in which it is soluble by merely adjusting the pH to a neutral or alkaline pH such as about pH 7 or more. Typical of such solute salts are salts such as carbonates, oxalates, tartrates, and the like, of calcium, strontium, barium, nickel, cobalt, copper, mercury, silver, iron, and the like. Preferably the acid used forms a water-insoluble salt when neutralized with a select alkaline material such as calcium (or other such alkaline earth metals) carbonate or hydroxide. For example, ferric sulfite is soluble in typically sulfurous or sulfurric acid which when reacted with calcium hydroxide form a water-insoluble precipitate.

Similarly, water soluble salts insoluble in aqueous acid solutions may be employ as a water solution into which water flows by osmosis, and after osmosis, the diluted solution and solute are rendered acid pH sufficiently to precipitate the acid-insoluble solute; this embodiment is desirable since mere water, i.e. not acid, is in contact with the semipermeable membrane. Although any suitable organic or inorganic salt of the above properties may be employed of conventional salts, for example, a typical and preferred example is the employment of silver sulfate which is insoluble in sulfuric or in sulfurous acids (for example), which acids when neutralized form preferably water-insoluble precipitates, such as with calcium hydroxide. After the solution is made acid, the silver sulfate precipitate is separated, and after the acid is neutralized, the precipitate thereof is filtered (or otherwise separated). In the acid solution, if aqueous sulfuric acid, then barium or strontium hydroxide are typical reactants. If sulfurous acid or chromic acid is employed, a hydroxide or carbonate may be used of a metal such as calcium, strontium, barium, nickel, cobalt, bismuth, cadnium, copper, mercury, silver, and lead. After neutralization, the precipitate may be removed by any convenient method such as filtration, centrifuging, and the like.

The semipermeable membrane for any of the osmosis processes of this invention may be any suitable material, plastic or otherwise, such as cellulose acetate, animal bladder, or any conventional semipermeable membrane known in the art.

It should be noted that the processes of this invention are not limited in scope to merely saline and/or sea water, but may be employed alone or in combination with other known processes for dewatering chemical or other wastes which contaminate water. For example, in regard to either industrial or domestic sewage, a preferred process would pass the polluted water through a filtering device such as any conventional filter or filtering means or process, and thereafter employ the processes of this invention to extract water by osmosis.

The invention described above in the preceding Specification includes in scope such modifications and/or equivalents as would be obvious substitutes to a person of skill in the art.

The entire disclosures of each of the parent applications Ser. No. 442,122 filed in the United States Patent Office on Mar. 23, 1965 and Ser. No. 813,376 filed in the United States Patent Office on Feb. 26, 1969, both of the same sole inventor as this application, is incorporated by reference into this specification as a part of the disclosure thereof.

I claim:

1. An article comprising a portable drinking vessel having a semipermeable membrane as a part of said vessel's base.

2. An article according to claim 1, in which said part comprises substantially said vessel's bottom, and in which said vessel is a cup.

3. An article according to claim 2, including an outer cover securable over said cup's bottom.

4. An article according to claim 3, including a water-soluble comestible food within said cup.

5. An article according to claim 4, including a removable top on said cup, sealably across said cup's opening.

6. An article according to claim 1, in which said part comprises at least a lower section of said vessel's wall, and in which said vessel is a cup.

7. An article according to claim 6, including a water-soluble comestible food within said cup, and including a removable top on said cup, sealably across said cup's opening.

8. An article comprising a portable vessel comprising an osmotic semipermeable membrane as an enclosing part of said vessel.

9. An article comprising a portable drinking vessel in which at least a portion of said vessel's enclosing structure is an osmotic semipermeable membrane.

10. An article comprising a vessel for containing a liquid, a portion of said vessel's enclosing structure being a non-semipermeable material, and another portion of said vessel's enclosing structure being an osmotic semipermeable structure.

11. An article according to claim 10, in which said osmotic structure comprises a ceramic material.

12. An article according to claim 11, in which said ceramic material comprises porcelain.

13. An article according to claim 12, in which said non-semipermeable material comprises a plastic flexible-membrane material, with said porcelain forming an osmotic port in a face of said material.

14. An article according to claim 11, in which said non-permeable material comprises a flexible material.

15. An article according to claim 14, in which said osmotic structure comprises a membrane.

* * * * *